Patented Oct. 11, 1932

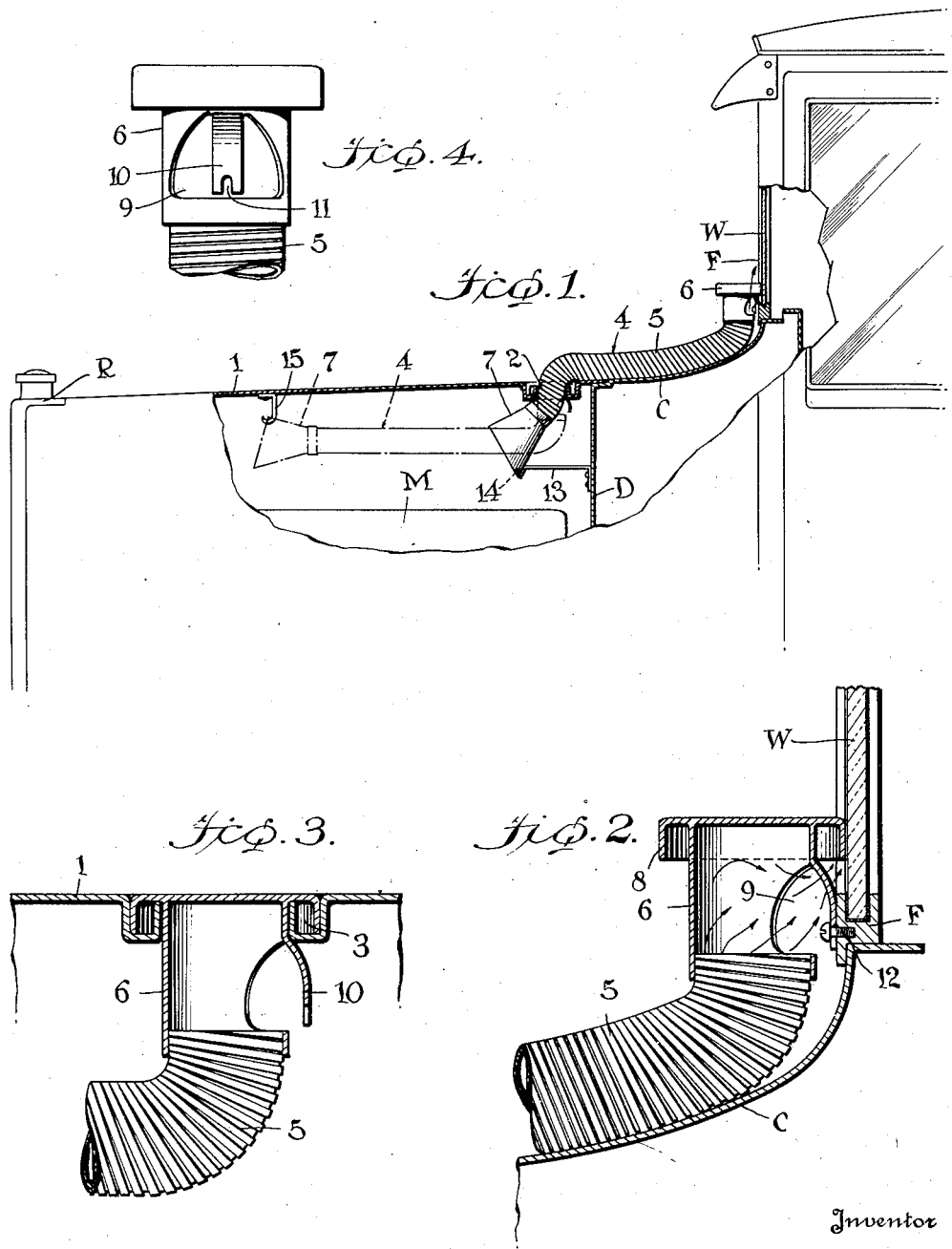

1,882,559

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

WINDSHIELD HEATER

Application filed May 15, 1930. Serial No. 452,769.

This invention relates to an improved means for preventing the accumulation of ice and snow upon the windshields of motor vehicles. More particularly it relates to that class of means wherein heated gases are thrown against the windshield, thereby warming it and preventing the freezing of water, or particles of snow or ice upon its surfaces.

The utility of windshield heaters of this character has long been recognized but they have not grown extensively in public use due perhaps to certain disadvantageous features inherent in previously known devices of this type. Among these were the difficulty of installation on the motor vehicle, this usually necessitating considerable change in the structural formation of the cowl and other portions of the motor car. The placing of parts of the heating devices on windshields and cowls was also undesirable since this was likely to destroy the symmetry and mar the appearance of the automobile.

It is the purpose of this invention to provide means for heating windshields which may be readily installed without extensive modification to any of the various parts of the motor car and which may when not in use be quickly and easily moved to a concealed position within the vehicle.

A preferred form of the invention is illustrated in the accompanying drawing wherein:

Fig. 1 is a side elevation showing the windshield heating device in operative position upon a motor vehicle, parts being broken away, and the inoperative position of the heater being indicated by broken lines.

Fig. 2 is an enlarged sectional view showing a part of the device in operative position, attached to the automobile windshield frame.

Fig. 3 is a view similar to Fig. 2 showing the same part of the device in inoperative position, seated within the motor hood of the automobile.

Fig. 4 is a rear view of the part of the heater device shown in Figs. 2 and 3.

Referring now more particularly to the drawing, wherein like parts are indicated by like reference characters, there is shown in Fig. 1 the front portion of a motor vehicle of conventional construction, having a radiator R, a motor M and a dashboard D. To the rear of the dashboard is a cowl C above which is disposed a channeled frame F which supports a windshield W.

The present invention contemplates a motor hood 1 of sheet metal, covering the motor M and the space immediately therearound. The hood is apertured at 2 adjacent its rear, upper surface and about this aperture is formed a circular recess 3. Extending from beneath the hood through the aperture is the windshield heating conduit indicated generally at 4.

This conduit comprises a central portion of flexible tubing 5, preferably of the armored metal type and of slightly smaller diameter than the aperture 2, an upper cap member 6 and a lower funnel 7, these parts being secured together in the relationship shown in Fig. 1 by any suitable means.

The cap 6 is of generally tubular shape with a closed top which extends outwardly from the upper periphery of the cap body and thence downwardly to provide a circular seating flange 8. Beneath the flange a portion of the cap is cut away to provide an exhaust opening 9 of any desired shape. Part of the cut away portion is bent outwardly from the side walls of the cap as shown in Figs. 3 and 4 forming a resilient retaining finger 10 which is notched at its lower end as at 11.

When the device is in operative position as shown in full lines in Fig. 1 and also in Fig. 2 the cap is disposed adjacent to the windshield W being retained in this position by engagement of the notched finger 10 with a retaining screw 12 threaded into the windshield frame F.

When in inoperative position as shown in broken lines in Fig. 1 and also in Fig. 2, the lower portion of the cap extends into aperture 2 of the hood 1, the circular flange 8 being seated within the circular recess 3. It is preferred that the outer diameter of the recess be substantially the same as that of the flange 8 and also that the depth of the recess and the height of the flange be equal in order that a tight flush fit between the parts may be obtained.

The funnel 7 which comprises the lower end of the conduit has a forward opening of relatively large size, and tapers rearwardly, being of approximately the same diameter as tube 5 at their point of juncture.

In operative position of the device the funnel may be supported by a bracket 13 secured in any suitable manner to the dashboard D. The bracket is disposed beneath the aperture 2 in the motor hood and has upon its outer end a projection 14 adapted to engage in an aperture formed on the underside of funnel 7.

The funnel is also apertured on its upper side for the reception of a hook 15 mounted at the forward end of hood 1, for supporting the lower end of the conduit in inoperative position.

In the operative position of the device shown in full lines in Fig. 1 of the drawing the funnel is disposed near the rear of motor M. Air passing into hood 1 through the radiator R and over the motor is heated by these parts and is placed under slight pressure by the forward movement of the vehicle and by the motor driven fan (not shown) usually disposed adjacent to the radiator. The conduit 4 provides a means of escape to the outside atmosphere for this heated air, conducting it through the funnel 7 and tube 5 and then discharging or exhausting it through the opening 9 in cap 6 against the windshield W, as is indicated by arrows in Fig. 2.

When weather conditions do not necessitate use of the windshield heater it may be readily removed from its position above the cowl by lifting the cap member upwardly thus disengaging finger 10 from the retaining member 12 and sliding it downwardly and forwardly into the space beneath hood 1. Here it may be firmly held at its lower end by the hook 15 and at its upper end by the seating engagement of the cap member within the recess 3 and the aperture 2 in the hood, the resilient finger 10 engaging under the recessed portion of the hood and removably retaining the cap. In this position the conduit will be entirely concealed from view and cannot in any way mar the appearance of the vehicle.

When it is again desirable to use the device it may be readily detached from hook 15 and pulled upwardly to operable position.

What is claimed is:

1. In combination with a motor vehicle having a windshield, a cowl, and a motor hood, a windshield heater comprising a conduit adapted when in operative position to extend from beneath said hood to a position above said cowl and adjacent to said windshield, said conduit being movable to an inoperative concealed position beneath said hood, and means for supporting the conduit in concealed position.

2. In combination with an automotive vehicle having a windshield, a cowl and a motor hood apertured adjacent to said cowl, means for conducting heated gases from beneath said hood to said windshield, comprising a movable conduit adapted to overlie said cowl in operative position, said conduit having an open end adapted to be secured adjacent to said windshield, and a lower portion extending through said aperture in said hood into the space beneath said hood, and means beneath said hood for supporting said conduit when it is passed through said aperture in the hood into inoperative concealed position beneath said hood.

3. In combination with an automotive vehicle having a windshield, a cowl and an apertured motor hood, a conduit movable in said aperture to an operative position overlying said cowl or to an inoperative position beneath said motor hood, whereby said conduit is concealed by said motor hood when not in use.

4. In combination with a motor vehicle having a windshield, a cowl adjacent said windshield, and a motor hood having an aperture, a conduit movable to a position adjacent the windshield and to a position beneath the hood, said conduit having an upper end portion adapted to seat in said aperture when the conduit is in the last mentioned position, and means associated with said windshield and upper end portion of said conduit whereby the latter may be removably secured adjacent to said windshield.

5. In combination with a motor vehicle having a windshield, a cowl adjacent said windshield, and an apertured motor hood, an elongated conduit adapted to extend through the aperture in said hood having a lower end permanently retained beneath said hood, the upper end of said conduit being adapted to seat in the aperture in said hood, said upper end of the conduit being movable over said cowl to a position adjacent to said windshield.

6. In combination with a motor vehicle having a windshield mounted on a supporting frame, a cowl adjacent said frame and a motor hood provided with a circular recessed portion and an aperture centrally thereof, a flexible conduit having a lower end adapted to be retained within said hood and an upper end portion provided with a flanged cap, a portion of the cap beneath the flange being cut away to provide an exhaust opening, said cut away portion being outwardly bent to provide a resilient finger to removably retain said flanged cap seated in the circular recess and aperture in said motor hood, and means on said windshield frame adapted to engage with said resilient finger to removably support said cap adjacent to said windshield.

7. In combination with a motor vehicle having a dashboard and a motor hood having an aperture therein, a conduit extending through said aperture, and slidable therethrough, an intake funnel provided on the lower end of said conduit, bracket means secured to said dashboard to removably support siad intake funnel in operative position, and means on said hood forward of said bracket means to removably support said intake funnel in inoperative position.

8. In combination with a motor vehicle having a windshield, a cowl, and a motor hood, the latter having an aperture therein, a flexible conduit movable through said aperture, a cap comprising one end of said conduit, means on said cap whereby it may be secured adjacent to said windshield, said cap being adapted to be moved into and to close the aperture in said hood.

9. In combination with an automotive vehicle having a windshield and a hood confining an engine compartment, said hood having an aperture therein, a movable conduit extending when in operative position through said aperture from the engine compartment into adjacency with the windshield for conducting heated gases to the windshield, said conduit being movable through said aperture into the engine compartment to remove it from said operative position.

JOHN R. OISHEI.